Feb. 13, 1973   W. Z. FAM   3,716,734
PARAMETRIC MOTOR
Filed Oct. 18, 1971

United States Patent Office 3,716,734
Patented Feb. 13, 1973

3,716,734
PARAMETRIC MOTOR
Wagih Zaki Fam, Halifax, Nova Scotia, Canada, assignor to Canadian Patents and Development Limited, Ottawa, Ontario, Canada
Filed Oct. 18, 1971, Ser. No. 189,886
Int. Cl. H02k 11/00
U.S. Cl. 310—72     3 Claims

ABSTRACT OF THE DISCLOSURE

An alternating current electric motor having a rotor, a first magnetic structure defining a first magnetic circuit, a second magnetic structure defining a second magnetic circuit, said first and second magnetic circuits including the said rotor in their magnetic paths, said first and second magnetic structures each having portions generally at right angles to each other, a first winding on said first structure and connected for energization from an alternating current single phase supply, a second winding on the said second structure connected to a capacitor to form a closed electrical circuit, said first and second windings positioned in space such that the second winding is excited parametrically from the first winding producing a flux in the second structure 90° out of phase with the first.

---

Figure 1:
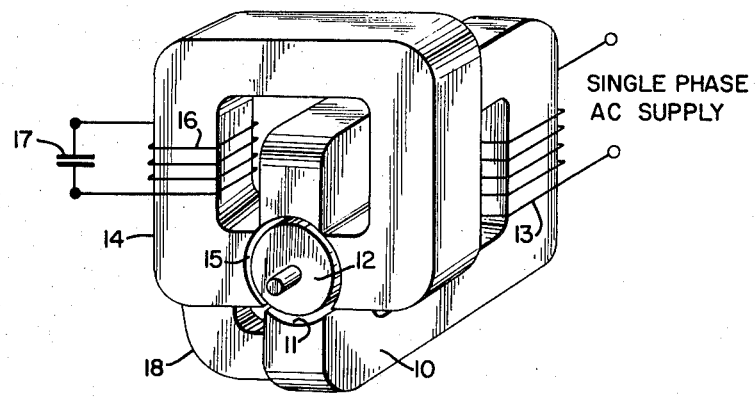

This invention relates to single phase alternating current motors and in particular to an alternating current motor that operates as a balance two-phase motor with single-phase supply input.

Single phase alternating current induction motors are well known and in widespread use but suffer from zero starting and low speed torque characteristics. Various methods of providing starting torque in electric motors such as the shaded-pole motor, the resistance split-phase motor, the capacitance start-induction run motor and the repulsion start motor solve the problem to a degree but add complexity and decrease efficiency. The three phase and two-phase motors provide good starting torque as they engender a rotating magnetic field automatically without need for special motor design techniques but of course require a three phase or two phase power supply. This may not always be convenient or available especially for the small sizes of motors.

It is known that, in an electric circuit consisting of a resistance, inductance, and capacitance, if the inductance is made to vary periodically at twice the natural frequency to which the circuit is tuned, parametric oscillations start to build up provided certain conditions are met. In the absence of a limiting mechanism, the amplitude of both the current and voltage will continue to increase until some component breaks down. This kind of oscillations can generally be described by a second-order differential equation of the Mathieu's type $$y'' + (a - 2q \cos 2z)y = 0$$

The presence of some non-linearity in the actual system, such as saturation of the iron core, will cause the oscillations to stabilize at a finite steady amplitude, in which case the describing equation becomes non-linear and includes one or more non-linear terms. One way of obtaining the double frequency variation in the inductance is through the interaction between the magnetic fields of two stationary iron-cored circuits having a common region between them. This idea has been used in a device called a Paraformer described by Wanlass et al. in a paper entitled "The Paraformer, A New Passive Power Conversion Device" published in the IEEE Wescon Tech Papers, Part 2, vol. 12, December 1968.

It is an object of the present invention to provide an alternating current electric motor that when supplied with single phase input operates as a balanced two phase motor.

It is another object of the invention to provide an electric motor supplied by single phase input that produces a rotating magnetic field and thus good starting torque.

These and other objects of the invention are achieved by an alternating current electric motor having a rotor, a first magnetic structure defining a first magnetic circuit, a second magnetic structure defining a second magnetic circuit, said first and second magnetic circuits including the said rotor in their magnetic paths, said first and second magnetic structures each having portions generally at right angles to each other, a first winding on said first structure and connected for energization from an alternating current single phase supply, a second winding on the said second structure connected to a capacitor to form a closed electrical circuit, said first and second windings positioned in space such that the second winding is excited parametrically from the first winding producing a flux in the second structure 90° out of phase with the first.

In this motor which may be called a parametric motor, the two stationary magnetic circuits which are 90° relative to each other in space form the stator of the machine and are designed such that the flux from one circuit modulates the reluctance of the other at double the frequency. The winding on the first circuit is excited directly from a single-phase supply, and the winding of the second circuit is closed on itself through a capacitor. Due to the double-frequency variation of the inductance of the second winding, parametric oscillations will build up with both the current and voltage rising until limited by the saturation of the iron core. The flux in that core will be 90° out of phase with the flux in the first magnetic circuit, and a rotating magnetic field is produced. A rotor placed in the common region between the two magnetic circuits will experience a torque converting the electrical energy input from the single-phase supply into mechanical energy.

The machine essentially performs two functions simultaneously; it changes a single-phase supply into a two-phase supply through the phenomenon of parametric oscillations, then utilizes the two-phase supply to convert electrical energy into mechanical energy.

Figure 2:
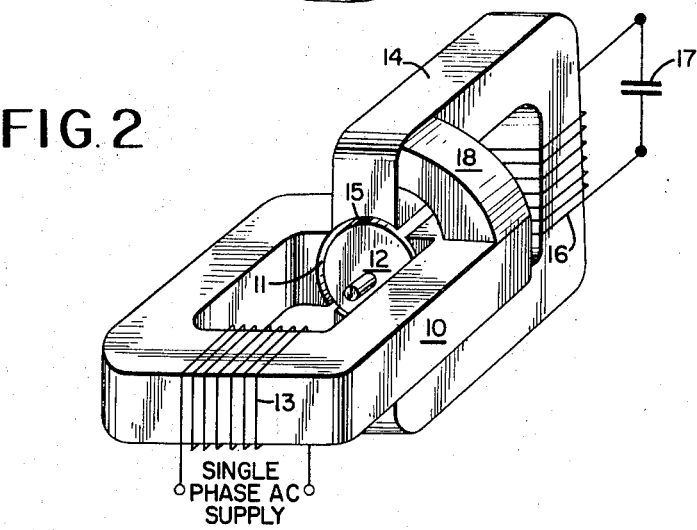
Figure 3:
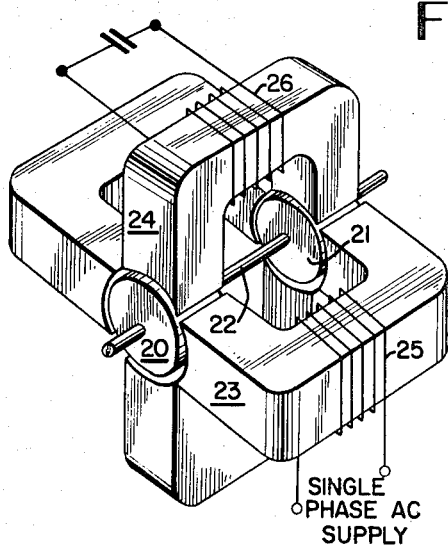

In drawings which ilustrate an embodiment of the invention,

FIG. 1 is a motor design showing a possible configuration of magnetic pole structures, FIG. 2 is a second motor design showing another possible configuration of magnetic pole structures, and FIG. 3 shows a motor configuration using two rotors in the same structure.

Referring to FIGS. 1 and 2, a magnetic core pole piece 10 has shaped pole faces 11 forming a magnetic gap in which is positioned a rotor 12. This rotor which could be of various types would be mounted in suitable bearings (not shown) and free to rotate. A winding 13 is wound on pole piece 10 and brought to terminals for connection to a single phase alternating current supply. This winding produces flux in the pole piece giving a first pair of poles at the rotor gap. A second pole piece 14 has shaped pole faces 15 giving a second pair of poles at the rotor gap orthogonal to the first pair. A winding 16 on pole piece 14 is connected to a tuning capacitor 17 but otherwise requires no external connection or excitation. A magnetic link 18 which joins the two magnetic circuits provides the initial conditions for the solution of the dferential equation governing the parametric oscillations.

The rotor of the machine forms the common region for two magnetic circuits which are at 90° to each other in space. The first magnetic circuit is excited directly by the single phase winding connected to the single phase supply. The winding on the second magnetic circuit has a current produced in it due to parametric oscillations. Because this winding is parametrically excited, the current produced is 90° out of phase with the supply current and therefore the fluxes in the two magnetic circuits are 90° out of phase. This is the condition required for a two phase induction motor and in fact the device operates as a balanced two-phase motor which engenders a rotating magnetic field.

FIG. 3 illustrates a double rotor arrangement and provides better utilization of the iron by the use of two rotors in the same magnetic circuit. Two rotors 20 and 21 connected by shaft 22 each form part of two magnetic circuits defined by magnetic pole structures 23 and 24. These latter are at 90° to each other in space. Structure 23 is excited by winding 25 which would be connected to a single phase AC supply. Winding 26 is parametrically excited and the machine operates generally as described for the FIGS. 1 and 2 versions. A magnetic link such as link 18 of the FIGS. 1 and 2 veresions is not required for this configuration since the magnetic circuits automatically provide the necessary initial conditions.

Different types of rotors—such as squirrel-cage or wound induction type, hysteresis, reluctance, or a composite rotor combining two or more of these—can be used with these magnetic circuits; and the external characteristics and performance of the motor will be influenced by the type of rotor used.

What is claimed is:
1. An alternating current electric motor comprising:
   (a) a rotor,
   (b) a first magnetic structure defining a first magnetic circuit,
   (c) a second magnetic structure defining a second magnetic circuit,
   (d) said first and second magnetic circuits including said rotor in their magnetic paths,
   (e) said first and second magnetic structures each having portions generally at right angles to each other,
   (f) a first winding on said first structure and connected for energization from an alternating current single phase supply,
   (g) a second winding on said second structure connected to a capacitor to form a closed electrical circuit,
   (h) said first and second windings positioned such that the second winding is excited parametrically.

2. An alternating current electric motor comprising:
   (a) a rotor,
   (b) a stator made up of a first pair of poles and a second pair of poles positioned generally at 90 degrees to the first pair circumferentially in relation to the rotor,
   (c) the first pair of poles connected to a first magnetic structure,
   (d) the second pair of poles connected to a second magnetic structure,
   (e) said first and second magnetic structures each having portions generally at right angles to each other,
   (f) a first winding on the first magnetic structure and connected for energization by a single phase supply,
   (g) a second winding on the second magnetic structure connected to a capacitor to form a closed electrical circuit, and to provide a flux at the second pair of poles 90 electrical degrees from the flux at the first pair of poles.

3. An alternating current electric motor comprising:
   (a) first and second interconnected rotors,
   (b) a first magnetic structure defining a first magnetic circuit,
   (c) a second magnetic structure defining a second magnetic circuit,
   (d) each of said first and second magnetic circuits including the first and second rotors at two positions in their magnetic paths,
   (e) a first winding on said first structure and connected for energization from an alternating current single phase supply,
   (f) a second winding on said second structure connected to a capacitor to form a closed electrical circuit,
   (g) said first and second magnetic structures positioned in space generally at right angles to each other such that the second winding is energized parametrically from the first winding.

References Cited
UNITED STATES PATENTS

| | | | |
|---|---|---|---|
| 2,121,550 | 6/1938 | Nyman | 318—220 |
| 2,842,729 | 7/1958 | Hillman | 310—166 X |
| 3,489,970 | 1/1970 | Wanlass | 323—60 UX |

DONOVAN F. DUGGAN, Primary Examiner

U.S. Cl. X.R.

310—172; 318—222